Patented Apr. 18, 1950

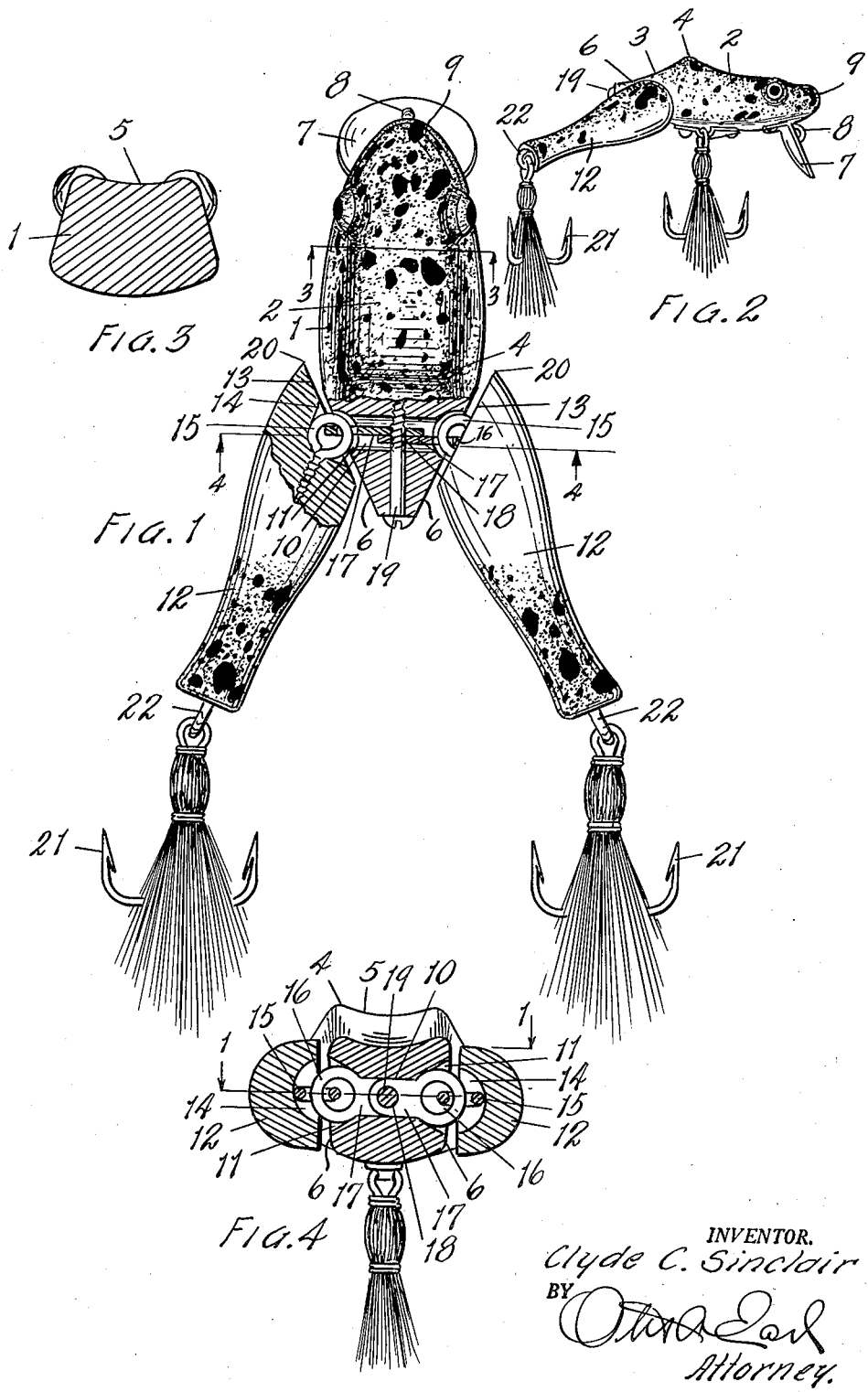

2,504,229

UNITED STATES PATENT OFFICE 2,504,229

FISH BAIT OR LURE

Clyde C. Sinclair, Paw Paw, Mich., assignor to Paw Paw Bait Company, Paw Paw, Mich.

Application June 2, 1949, Serial No. 96,634

7 Claims. (Cl. 43—42.13)

This invention relates to improvements in fish bait or lure.

The main objects of this invention are:

First, to provide a fish bait or lure simulating a frog in appearance and in movement when the bait is manipulated or propelled in the water.

Second, to provide a fish bait or lure of this character which may be quite economically produced.

Objects relating to details and economies of the invention will appear from the description to follow. The invention is pointed out in the claims.

A preferred embodiment of the invention is illustrated in the accompanying drawings, in which:

Fig. 1 is a plan view of a fish bait or lure embodying my invention portions being broken away and shown in longitudinal section on line 1—1 of Fig. 4.

Fig. 2 is a side elevational view.

Fig. 3 is a cross section on a line corresponding to line 3—3 of Fig. 1.

Fig. 4 is a cross sectional view on a line corresponding to broken line 4—4 of Fig. 1.

In the accompanying drawing certain of the figures are considerably enlarged as compared to the commercial bait or lure.

In the embodiment of my invention illustrated the body member 1 is provided with a forwardly inclined top portion 2 and a rearwardly inclined rear portion 3 merging into a hump or high part at 4. These inclined top portions are of concave transverse section as shown at 5. The body member has rearwardly converging flattened rear side portions 6. A downwardly and forwardly projecting blade 7 is secured to the front end of the body adjacent the tip thereof to cause the bait to dive when it is drawn through the water.

The line attaching eye 8 is attached to the under side of the body in advance of the blade but substantially at the rear of the tip or nose 9 of the body. The rearwardly tapered portion of the body has a transverse horizontal bore 10 therethrough terminating at its ends in concave sockets 11. The legs 12 are of generally rearwardly tapered form shaped, however, to simulate the legs of a frog. The angularly disposed forward ends of the legs 13 are flat and have central recesses or sockets 14 in which the eyes 15 of the screw eyes are seated, these projecting slightly to engage the eyes 16 of the attaching link 17. These attaching links 17 are desirably sheet metal stampings and of such width that their edges engage the walls of the bore as shown in Fig. 4.

The inner ends of the links are overlapped and provided with holes 18 receiving the screw 19 threaded into the body from its rear end.

It will be noted that the extreme forward ends 20 of the legs project forwardly and outwardly from the sides of the body so that as the bait is drawn through the water they engage the water and cause the legs to swing on their central connections. Normally the ends of the legs are spaced from the body, that is, when the bait is in floating position but when the bait is drawn forwardly the leg members are swung inwardly so that quite an effective simulation of a swimming frog results. The flattened inner ends of the legs coact with the sides of the body to limit the swinging movement of the legs in all directions. Hooks 21 are attached to the rear ends of the legs at 22.

The bait of my invention has a novel and very desirable action when drawn through the water quite closely simulating a swimming frog.

I have not attempted to illustrate or describe other embodiments or adaptations of my invention as it is believed that this disclosure will enable those skilled in the art to embody or adapt my invention as may be desired.

Having thus described my invention, what I claim as new and desire to secure by Letters Patent is:

1. A fish bait or lure comprising a body member having flattened sides terminating at their rear ends in rearwardly converging portions, the top of the body being slightly concaved in cross section and having a forwardly inclined portion and a rearwardly inclined portion merging adjacent to but somewhat in advance of the rearwardly converging side portions of the body, the portion of the body having the rearwardly and converging side portions having a transverse bore therethrough with concaved enlargements at the ends thereof, leg members having flattened inner ends provided with sockets, flat leg attaching links provided with eyes at their outer ends disposed in the recesses at the ends of said transverse bore, said links being disposed vertically edgewise with their edges in supported engagement with the wall of the bore and with their inner ends in overlapping relation and provided with registering holes, a link retaining element disposed longitudinally of the body through the said registering openings in said links whereby they are retained and rotative movement thereof is prevented, and screws threaded into said leg members and having eyes disposed in said leg sockets and engaging the eyes in said links whereby the leg members are articulated to the body with their inner ends closely adjacent to the body member but spaced therefrom to permit limited swinging movement of the legs, the inner ends of the leg members coacting with the said rearwardly converging side portions of the body to limit the swinging movement of the legs in all directions.

2. A fish bait or lure comprising a body member having flattened sides terminating at their rear ends in rearwardly converging portions, the top of the body being slightly concaved in cross section and having a forwardly inclined portion and a rearwardly inclined portion merging adjacent to but somewhat in advance of the rearwardly converging side portions of the body, the portion of the body having the rearwardly and converging side portions having a transverse bore therethrough with enlargements at the ends thereof, leg members having flattened inner ends provided with sockets, leg attaching links provided with eyes at their outer ends disposed in the recesses at the ends of said transverse bore, said links being in supported engagement with the wall of the bore and with their inner ends in overlapping relation and provided with registering holes, a link retaining element disposed through the said registering openings in said links whereby they are retained and rotative movement thereof is prevented, and leg attaching eyes disposed in said leg sockets and engaging the eyes in said links whereby the leg members are articulated to the body with their inner ends closely adjacent to the body member but spaced therefrom to permit limited swinging movement of the legs, the inner ends of the leg members coacting with the said rearwardly converging side portions of the body to limit the swinging movement of the legs in all directions.

3. A fish bait or lure comprising a body member having rearwardly converging rear side portions at its rear end, the portion of the body having the rearwardly and converging side portions having a transverse bore therethrough, leg members having flattened inner ends provided with sockets, flat attaching links provided with eyes at their outer ends, said links being disposed vertically edgewise with their edges in supported engagement with the wall of the bore and with their inner ends in overlapping relation and provided with registering holes, a link retaining element disposed longitudinally of the body through the said registering openings in said links whereby they are retained and rotative movement thereof is prevented, and screws threaded into said leg members and having eyes disposed in said leg sockets and engaging the eyes in said links whereby the leg members are articulated to the body with their inner ends adjacent to the body member to permit restricted swinging movement relative thereto, the inner ends of the leg members coacting with the said rearwardly converging side portions of the body to limit the swinging movement of the legs.

4. A fish bait or lure comprising a body member having rearwardly converging rear side portions at its rear end, the portion of the body having the rearwardly and converging side portions having a transverse bore therethrough, leg members having flattened inner ends provided with sockets, attaching links provided with eyes at their outer ends, said links being in supported engagement with the wall of the bore and with their inner ends in overlapping relation and provided with registering holes, a link retaining element disposed through the said registering openings in said links whereby they are retained and rotative movement thereof is prevented, and leg attaching eyes disposed in said leg sockets and engaging the eyes in said links whereby the leg members are articulated to the body with their inner ends adjacent to the body member to permit restricted swinging movement relative thereto, the inner ends of the leg members coacting with the said rearwardly converging side portions of the body to limit the swinging movement of the legs.

5. A fish bait or lure comprising a body member having rearwardly converging side portions at its rear end and having a horizontal transverse bore through said rear end portion, rearwardly tapering leg members having angularly disposed flattened inner ends having central recesses therein, leg attaching eyes seated in said recesses, and links with which said eyes are engaged secured within said bore in said body, the flattened inner ends of the leg members being disposed at a converging angle relative to the longitudinal axis of the bait body the forward portions thereof projecting angularly beyond the sides of the body.

6. A fish bait or lure comprising a body member having rearwardly converging side portions at its rear end, leg members having angularly disposed flattened ends swingably articulated to the said converging side portions of said body for swinging movement relative thereto, the flattened ends of the leg members being closely adjacent to but spaced from the side members when the leg members are in a normal rearwardly diverging relation, and hooks swingably mounted on the inner ends of the leg members.

7. A fish bait or lure comprising a body member having rearwardly converging side portions at its rear end, rearwardly tapering leg members having angularly disposed flattened inner ends articulated centrally to the said rearwardly converging side portions of the body, the flattened inner ends of the leg members being disposed at a rearwardly converging angle relative to the longitudinal axis of the bait body with the forward portions thereof projecting from the body to engagement of water therewith when the bait is propelled through the water.

CLYDE C. SINCLAIR.

REFERENCES CITED

The following references are of record in the file of this patent:

UNITED STATES PATENTS

| Number | Name | Date |
| --- | --- | --- |
| 1,602,329 | Bonnett | Oct. 5, 1926 |
| 2,047,768 | Christiansen | July 14, 1936 |
| 2,230,919 | Wick | Feb. 4, 1941 |
| 2,234,077 | Hayley, Jr. | Mar. 4, 1941 |
| 2,478,655 | Davis | Aug. 5, 1949 |